United States Patent [19]
Chauvin et al.

[11] Patent Number: 5,283,504
[45] Date of Patent: Feb. 1, 1994

[54] GRID CORRECTION CIRCUIT FOR TV SETS

[75] Inventors: Jaques Chauvin, Mönchweiler; Rainer Schweer, Niedereschach; Günter Gleim, Villingen; Friedrich Heizmann, Obereschach, all of Fed. Rep. of Germany

[73] Assignee: Deutsche Thomson-Brandt GmbH, Villingen, Fed. Rep. of Germany

[21] Appl. No.: 920,360

[22] Filed: Jul. 29, 1992

Related U.S. Application Data

[63] Continuation of PCT/EP90/02307, Dec. 24, 1990.

[30] Foreign Application Priority Data

Dec. 30, 1989 [DE] Fed. Rep. of Germany ....... 3943421

[51] Int. Cl.$^5$ ............................................. H01J 29/56
[52] U.S. Cl. ................................................... 315/370
[58] Field of Search ................. 315/370, 371, 368.12

[56] References Cited

U.S. PATENT DOCUMENTS

| | | | |
|---|---|---|---|
| 4,099,092 | 7/1978 | Beistow | 315/10 |
| 4,251,754 | 2/1981 | Navarro et al. | 315/370 |
| 4,812,713 | 3/1989 | Blanchard | 315/370 |

FOREIGN PATENT DOCUMENTS 2747239 7/1978 Fed. Rep. of Germany ........... H01J 29/72

Primary Examiner—Theodore M. Blum
Attorney, Agent, or Firm—Joseph S. Tripoli; Joseph J. Laks; Daniel E. Sragow

[57] ABSTRACT

A grid correction circuit for a television receiver includes a first memory for storing correction values for correcting the deflection current of the television receiver. A second memory periodically provides a test signal to a correction coil to correct the deflection of the television receiver. A switch periodically selectively connects the first memory to the correction coil and a correction current flows through the correction coil. The switch also periodically connects the second memory to the correction coil and a test current flows through the correction coil. An impedance is responsive to the correction coil and produces a correction voltage and a test voltage in response to the correction current and the test current respectively. A comparator receives the test voltage and compares the test voltage to a reference voltage and provides an output voltage having a first level when the test voltage is below the reference voltage and a second level when the test voltage is above the reference voltage. A processor receives the output voltage and changes the correction voltage to incrementally reciprocate above and below the reference voltage by a preselected increment to maintain the correction voltage at substantially the same level as the reference voltage over a long time period.

5 Claims, 1 Drawing Sheet

GRID CORRECTION CIRCUIT FOR TV SETS

This is a continuation of PCT application PCT/EP 90/02307 filed Dec. 24, 1990 by Jacques Chauvin, Rainer Schweer, Gunter Gleim and Friedrich Heizmann and titled "Grid-Correction Circuit For TV Sets".

In a prior art grid correction circuit for adjusting the grid position on the screen of a TV set, the current to a correction coil is periodically altered by a small increment in order to adjust the deflection of the tube. The slight displacement in the position of the display on the screen which is caused by the deflection alteration can be in either the vertical or the horizontal direction and is so small that it cannot be perceived visually. However, if the small alteration in the deflection occurs periodically, it is possible for it to be perceived as shaking, or jittering, of the picture. This is particularly valid when a lattice design of horizontal and vertical lines is displayed on the screen.

It is an object of the invention to avoid the disturbing periodic motion of the screen deflection without impairing the normal function of the grid correction circuit by using a reciprocating (pendulum) fluctuation of the deflection current around a reference current value.

The invention is based on the fact that an incremental reciprocating fluctuation around a reference current value is necessary to ensure that the actual value does not slowly move in one direction from the desired value without the movement being registered by the correction circuit. However, it is sufficient for the reciprocation to occur only periodically when no picture is displayed, for example, during either the vertical blanking interval or the horizontal blanking interval. The reciprocation does not normally occur during the time that a picture is displayed. The correction current is altered when a display is visible only if the reciprocating motion during the blanking interval results in a divergence when is too large, that is in excess of two increments of the reciprocating current. The reciprocating current technique can be advantageously used with a stationary picture without disturbing the periodic motion of the deflection screen.

A preferred embodiment of the invention is illustrated in the figures in which.

Figure 1:
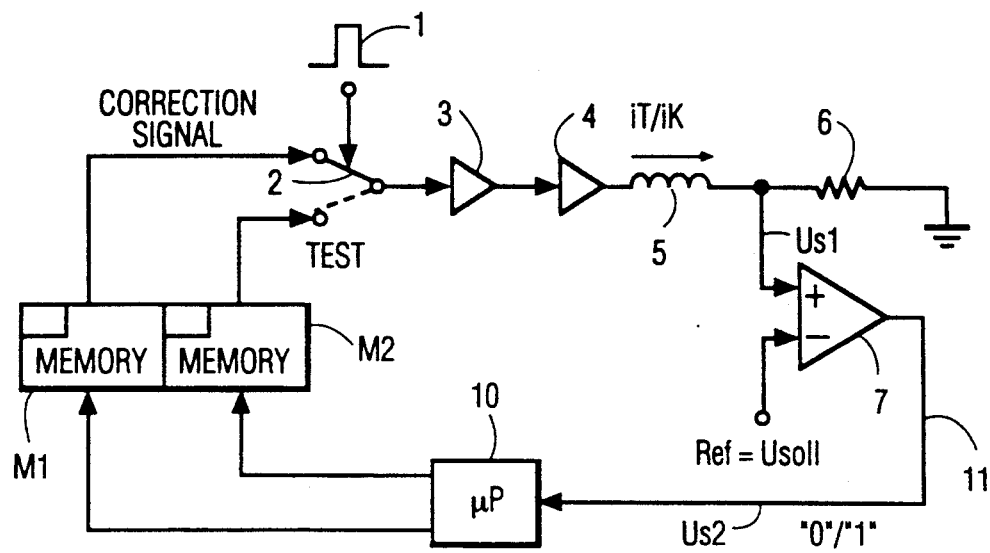
FIG. 1 is a block diagram of a preferred embodiment.

In FIG. 1, the memory M1 stores correction values for the deflection screen. The memory M1 provides, via a switch 2 and amplifiers 3 and 4, a correction current iK to a correction coil 5 for the convergence of picture elements which are defined by a lattice design on the screen of a television receiver. One memory unit in the memory M1 is activated for every point of the lattice design.

In addition to the dynamic correction of the convergence of successive picture elements, another test process is performed in order to stabilize the static position of the picture, the so-called offset position. The memory M2 generates a test signal for this purpose. The test signal is periodically provided to the correction coil 5 when the switch 2 is in the position shown by the dotted line. At this time the correction signal from memory M1 is disconnected from the coil 5. A test current iT having a defined desired value, is generated by the test signal. Deviations of the test current iT from the desired value are compensated by the correction circuit. For compensation purposes, a resistor 6 is connected to the low voltage end of the correction coil 5 to provide a voltage Us1 which is proportional to the test current iT at the low voltage end of coil 5. The voltage Us1 is input to a comparator 7, which compares voltage Us1 to a reference voltage Usoll. The output of comparator 7 is low "0" when Us1 is lower than voltage Usoll and high "1" when Us1 is higher than Usoll.

Figure 2:
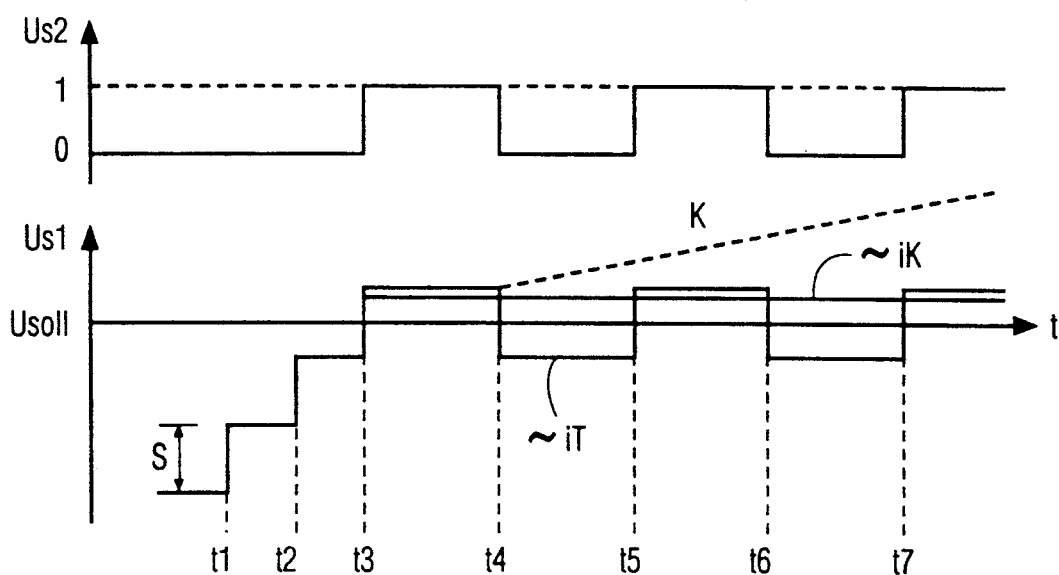
FIG. 2 shows curves which illustrate the operation of the preferred embodiment.

The operation of the FIG. 1 embodiment is explained by reference to FIG. 2. At time t1, the voltage Us1 is determined by the test current iT and has a value which is lower than the reference voltage Usoll. The comparator 7 then supplies the digital output voltage Us2 with a low value "0". The digital signal Us2 is input to the microprocessor 10, which feeds the two memories M1 and M2. The memory M2 now receives the information, based on the value of the voltage Us2, that the test current iT from the test signal which was provided to correction coil 5 was not as high as the reference voltage Usoll. Accordingly, the test signal and the test current are raised an incremental step S. During the next vertical blanking interval it is established that voltage Us2 has not been changed. It therefore is known that voltage Usi remains lower than Usoll and the attempt to correct the deflection current was not effective. Therefore, at time t2 the test signal is increased by another incremental step S and the correction current iK, which is generated by the test signal, also increases by one increment. However, voltage Us1 remains lower than Usoll and the output of comparator 7 remains low "0". Voltage Us1 is increased by another step S at time t3 during the next vertical blanking interval. With this increase, the desired value of reference voltage Usoll is reached and the output voltage Us2 of comparator 7 goes to high "1". This change signals the processor 10 and the memory M2 that the correction was effective and therefore voltage Us1 has reached the desired value and no further correction is necessary.

Theoretically, the circuit could remain in the condition utilizing the adjusted test signal and the resulting correction current iK. However, if a deviation occurs over a longer period of time and the voltage Us1 deviates as shown by the dotted curve K in FIG. 2, the comparator 7 would not respond because the switching threshold was previously reached at time t3. The entire circuit would no longer be able to register the deviation illustrated by curve K. Therefore, after a preselected time, the test signal is decreased by one increment S at time t4. When the microprocessor 10 registers a change in output voltage Us2 from "1" to "0" in response to the decrease, the change in output voltage Us2 is an indication that the desired voltage level Us1 at resistor 6 has remained close to the reference level Usoll. The change in output voltage Us2 therefore is the result of the incremental step S, which was applied at time t4. The test voltage is increased one incremental step S at time t5 and the test repeated. The reciprocal changes to the test voltage occur periodically at times t4, t5, t6, t7, as shown in FIG. 2.

The reciprocating changes in the test voltage occur during the vertical blanking interval or the horizontal blanking interval when no visible picture is displayed on to the screen. During the time a visible display is present the correction is not subject to the reciprocating changes and remains constant, as indicated by the curve iK in FIG. 2. The correction current iK is corrected during a visible display only when the circuit registers a deviation of Us1 from the reference voltage Uso11, which is greater than an incremental step S. Experience shows that such changes are relatively rare because the entire circuit serves to stabilize long-term fluctuations. Experience also shows that because such changes are rare they do not cause jittering of the display and thus are not visually objectional or disturbing. The circuit can also be constructed so that the change to the correction current iK initially occurs when the deviation from the reference value Uso11 is several steps, for example, two, three or four steps.

We claim:

1. A correction circuit for a television receiver comprising:
    first memory means for storing correction values for correcting the deflection current of said television receiver;
    second memory means for providing a test signal;
    correction coil means for correcting the deflection of said television receiver;
    switch means for periodically selectively connecting said first memory means to said correction coil means whereby a correction current flows through said correction coil, and for periodically connecting said second memory means to said correction coil means whereby a test current flows through correction coil means;
    impedance means responsive to said correction coil means for producing a correction voltage and a test voltage in response to said correction current and said test current respectively;
    comparator means for receiving said test voltage and comparating said test voltage to a reference voltage and providing an output voltage having a first level when said test voltage is below said reference voltage and a second level when said test voltage is above said reference voltage; and
    processor means for receiving said output voltage and changing said correction voltage to incrementally recprocate above and below said reference voltage by a preslected increment to maintain said correction voltage at substantially the same level as said reference voltage over a long time period.

2. The correction circuit of claim 1 wherein said output voltage is low when said correction voltage is below said reference voltage and high when said correction voltage is above said reference voltage.

3. A method of correcting deflection errors in a television receiver comprising the steps of:
    storing correction values for selected points in the display on said receiver and providing a correction current to a correction coil during blanking intervals of said receiver;
    periodically providing a test current to said correction coil to produce a test voltage;
    comparing said test voltage to a reference voltage and generating an output voltage having a first level when said test voltage is below said reference voltage and a second level when said test voltage is above said reference voltage;
    sensing said output voltage and reciprocating said correction voltage above and below said reference voltage by an incremental voltage and changing said correction voltage when said output voltage indicates that said correction voltage is different from said reference voltage by at least one increment to maintain said correction voltage at substantially the same level as said reference voltage.

4. The method of claim 3 wherein said blanking intervals are the vertical blanking intervals.

5. The method of claim 3 wherein said blanking intervals are the horizontal blanking intervals.

* * * * *